(12) United States Patent
Patterson et al.

(10) Patent No.: US 8,944,489 B2
(45) Date of Patent: Feb. 3, 2015

(54) VARIABLE AERODYNAMIC DEVICE

(75) Inventors: Neil Patterson, Wokingham (GB);
Jeremy Curnow, Twyford (GB); John Begley, Twyford (GB)

(73) Assignee: McLaren Automotive Limited, Woking, Surrey (GB)

(*) Notice: Subject to any disclaimer, the term of this patent is extended or adjusted under 35 U.S.C. 154(b) by 0 days.

(21) Appl. No.: 13/395,088

(22) PCT Filed: Sep. 8, 2010

(86) PCT No.: PCT/EP2010/063165
§ 371 (c)(1),
(2), (4) Date: May 22, 2012

(87) PCT Pub. No.: WO2011/029840
PCT Pub. Date: Mar. 17, 2011

(65) Prior Publication Data
US 2013/0057021 A1    Mar. 7, 2013

(30) Foreign Application Priority Data

Sep. 8, 2009 (GB) .................................. 0915698.5

(51) Int. Cl.
*B62D 35/00* (2006.01)
*B60T 1/16* (2006.01)
(52) U.S. Cl.
CPC ................. *B62D 35/007* (2013.01); *B60T 1/16* (2013.01); *Y10S 180/903* (2013.01)
USPC ...................................... 296/180.1; 180/903

(58) Field of Classification Search
USPC .............. 296/180.1–180.5; 180/903; 105/1.1, 105/1.2; 244/35, 37–39, 204, 206, 99.3, 244/99.5, 213, 215
See application file for complete search history.

(56) References Cited

U.S. PATENT DOCUMENTS 6,382,708 B1    5/2002  Erdelitsch et al.
6,805,399 B1   10/2004  Brown et al.
(Continued)

FOREIGN PATENT DOCUMENTS

EP    1040985 A1    10/2000
FR    2816904 A1     5/2002
(Continued)

OTHER PUBLICATIONS

International Search Report mailed Oct. 25, 2010 in PCT/EP2010/063165, 15 pp.
UK Search Report mailed Dec. 14, 2010 in GB0915698.5, 3 pp.

*Primary Examiner* — Dennis H Pedder
(74) *Attorney, Agent, or Firm* — James F. Hann; Haynes Beffel & Woldfeld LLP

(57) ABSTRACT

A variable aerodynamic device for a vehicle, comprising: a wing element (1) having a front and a rear; a frame or body (2) for mounting to a vehicle; a linear actuator (4, 5) mounted between the body (2) and a first mounting point or first location (8) on the wing element for moving the rear of the wing element between a raised position and a lowered position relative to the body; and a guide strut or linkage (9) mounted between the body and the wing element, the linkage being pivotally coupled to the wing element at a second mounting point or second location (10) forwards of the first location (8); the linkage being configured such that when the rear of the wing element is moved by the linear actuator between the raised position and the lowered position, the second location moves rearwardly relative to the body.

22 Claims, 3 Drawing Sheets

(56) References Cited

U.S. PATENT DOCUMENTS 7,220,032 B2 * 5/2007 Mori ............................ 362/541
2008/0061596 A1   3/2008 Brown et al.
2010/0090497 A1   4/2010 Beckon

FOREIGN PATENT DOCUMENTS

| WO | 2005058677 A1 | 6/2005 |
| WO | 2010030158 A1 | 3/2010 |

* cited by examiner

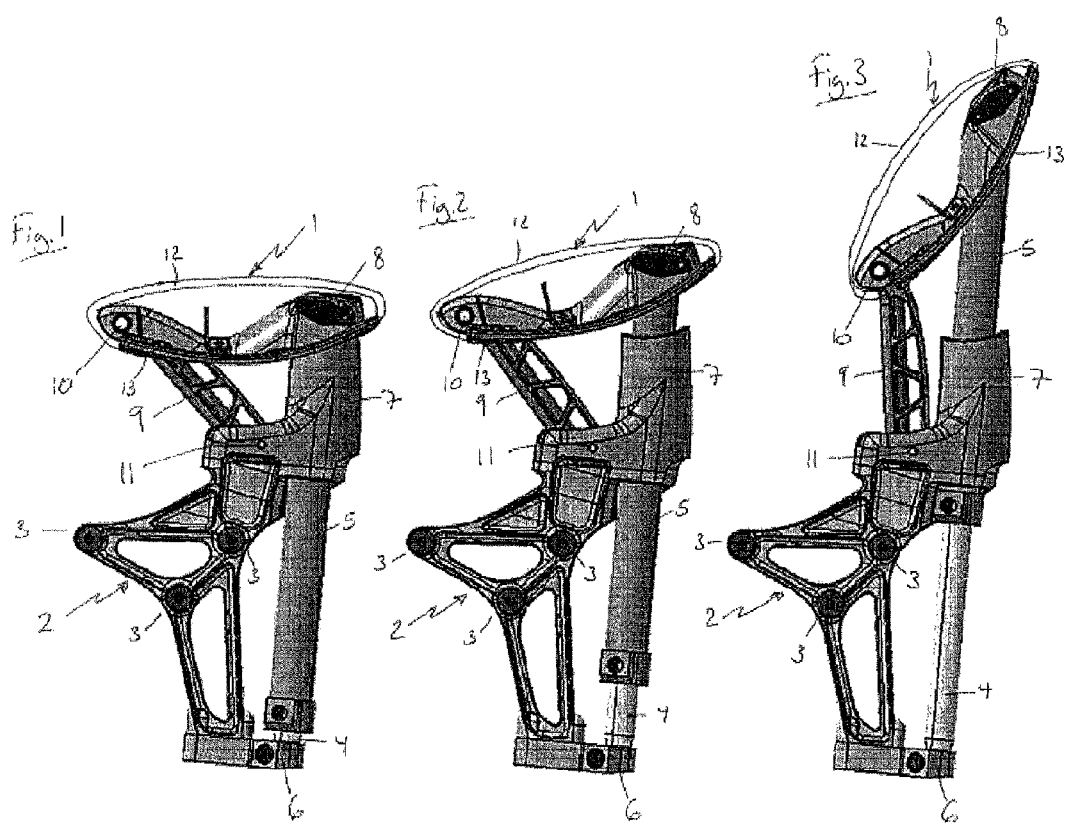

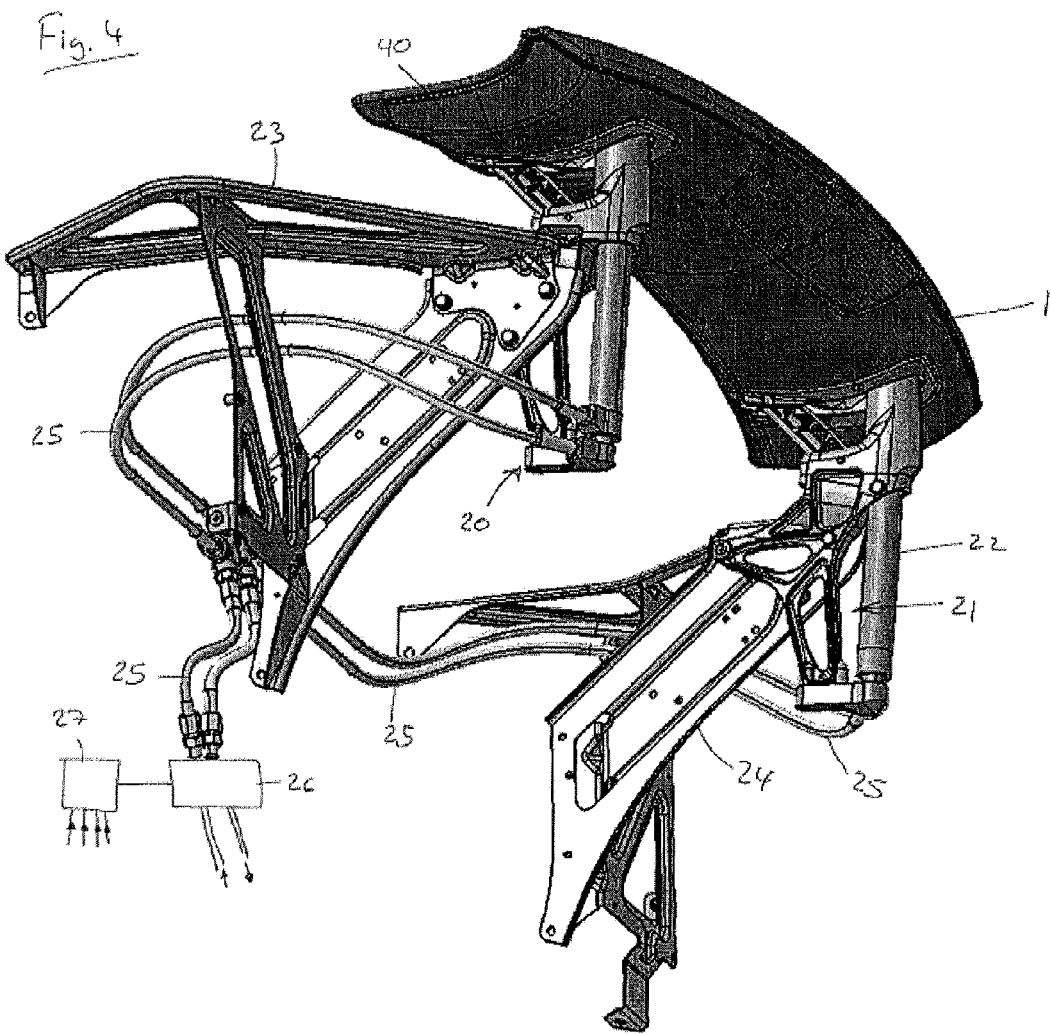

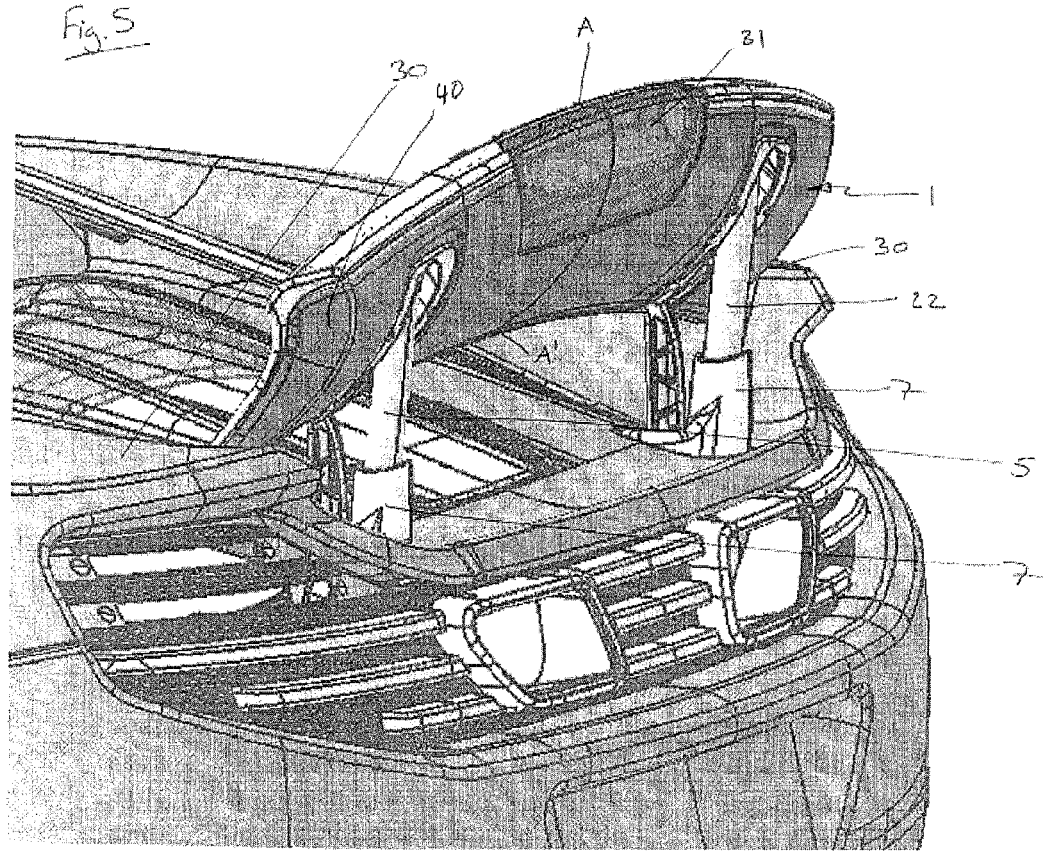
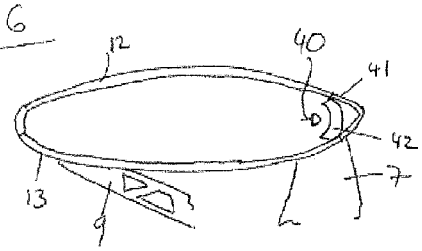

VARIABLE AERODYNAMIC DEVICE

This invention relates to a variable aerodynamic device, for example an air brake and/or wing.

Many cars are fitted with fixed aerodynamic devices to improve downforce or reduce drag. Some of these can be adjusted and then re-fixed in place whilst the car is stopped. Other cars have aerodynamic devices that can be adjusted whilst the car is in motion. Typically these lie flush with the upper bodywork when the car is at rest, and can be deployed to act as a wing when the car is moving at high speed (as in some models of Porsche 911) or to act as an air brake when the car is being braked (as in a McLaren Mercedes SLR).

The Bugatti Veyron has an air brake in the form of a panel that lies substantially flush with the upper bodywork when it is not needed. When it might be needed a set of actuators elevate it above the bodywork on a pair of pylons so that it is spaced from the bodywork and directed in a substantially horizontal orientation. When the vehicle is to be braked a second set of actuators rotates the panel with respect to the pylons into a more vertical orientation. One problem with this design is the need to elevate the panel before the brake is deployed. This means that this air brake is unsuitable for impromptu use.

The McLaren Mercedes SLR has an air brake in the form of a panel that lies substantially flush with the upper bodywork when it is not needed. When the vehicle is to be braked the panel is tilted forwards about its front edge, the rear edge being raised so that it projects above the bodywork. In this design there is substantially no vertical gap between the front of the panel and the adjacent upper bodywork when the air brake is deployed. The air brake of the McLaren F1 is similar. These air brakes can be deployed without the need for a separate action of elevating the panel before use. However, these air brakes do not provide the driver with additional functions when braking is not being performed, such as acting as a wing to increase downforce.

It would be desirable to have a variable aerodynamic device for a vehicle such as a car that can be readily moved from a stowed position to a braking position whilst the car is in motion, and vice versa, and that can also act as a wing to increase downforce.

According to one aspect of the present invention there is provided a variable aerodynamic device for a vehicle, comprising: a wing element having a front and a rear; a body for mounting to a vehicle; a linear actuator mounted between the body and a first location on the wing element for moving the rear of the wing element between a raised position and a lowered position relative to the body; and a linkage mounted between the body and the wing element, the linkage being pivotally coupled to the wing element at a second location forwards of the first location; the linkage being configured such that when the rear of the wing element is moved by the linear actuator between the raised position and the lowered position the second location moves rearwardly relative to the body.

The body may comprise a mount for the linear actuator. The mount may be configured so as to constrain the linear actuator from moving rearwardly when the rear of the wing element is in the raised position.

The mount for the linear actuator may be configured so as to constrain the linear actuator to move linearly relative to the body.

The mount for the linear actuator may comprise a tube through which the linear actuator passes.

The linear actuator may be pivotally mounted to the wing at the first location.

The linkage may comprise a strut pivotally connected to the wing at the second location and pivotally connected to the body at a third location.

When the rear of the wing element is in its lowest position the angle between the line connecting the first and second locations and the line connecting the second and third locations may be less than 60 degrees, and more preferably less than 50 degrees.

When the rear of the wing element is in its highest position the angle between the line connecting the first and second locations and the line connecting the second and third locations may be greater than 120 degrees, more preferably greater than 130 degrees.

The profile of the wing element may be such that in a first position of the wing element relative to the body the wing element is streamlined so as to be capable of imposing substantially no rearward force on the body as a result of the action of rearward airflow on the wing.

The profile of the wing element may be such that in a second position of the wing element relative to the body the wing element is capable of imposing a downforce on the body as a result of the action of rearward airflow on the wing.

In the second position the front and/or rear of the wing may be higher than in the first position.

The profile of the wing element may be such that in a third position of the wing element relative to the body the wing element is capable of imposing a rearward force on the body as a result of the action of rearward airflow on the wing.

In the third position the front and/or rear of the wing may be higher than in the first position.

In the third position the front and/or rear of the wing may be higher than in the second position.

The linear actuator may be capable of moving the wing element continuously between the first, second and third positions.

The variable aerodynamic device may comprise a control unit configured for causing the wing element to rest in each of the first, second and third positions.

According to a second aspect of the present invention there is provided a variable aerodynamic device capable of acting as an air brake for a vehicle, the variable aerodynamic device being rotatable about a lateral axis between a stowed position and a braking position and comprising a high-level stop light.

The high-level stop light may comprise a light source and a wide-angle lens for dispersing light from the light source so that it can shine rearwardly throughout the rotational range of the variable aerodynamic device.

According to a third aspect of the invention there is provided a vehicle comprising a variable aerodynamic device as set out above. The vehicle is preferably a road vehicle.

The present invention will now be described by way of example, with reference to the accompanying drawings. In the drawings:

FIG. 1 is a side view of a variable aerodynamic device (VAD) in stowed configuration.

FIG. 2 is a side view of the VAD in downforce configuration.

FIG. 3 is a side view of the VAD in air brake configuration.

FIG. 4 shows the whole VAD assembly from the side, rear and below.

FIG. 5 shows the VAD installed in a vehicle.

FIG. 6 is a cross-section of the aerodynamic panel of the VAD, showing brake lighting.

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

In the figures, like numerals indicate like parts.

The VAD of the figures can be moved continuously between a stowed configuration and an air brake configuration. In moving between those configurations it passes through an intermediate configuration in which it acts to provide downforce to a vehicle on which it is installed. The VAD is moved between the configurations by a single pair of actuators, one at each end. The VAD has a wing element which generates the downforce and braking.

In more detail, FIG. 1 shows a side view of the VAD. The VAD comprises a horizontally extending wing element 1. As can be seen in FIG. 5, when the VAD is installed on a vehicle the wing element extends laterally across at least part of the vehicle's width. The wing element is aerodynamically profiled so that its cross-sectional shape is capable of providing the downforce and braking effects described below.

In FIGS. 1 to 3 end caps of the wing element (40 in FIGS. 4 and 5) are omitted for clarity.

On either side of the wing element the VAD has a support structure by means of which it can be mounted to the body of a vehicle. The support structure has means to raise and lower the wing and means to control the path of the wing element as it is raised and lowered. Only the left support structure is shown in FIGS. 1 to 3, but the right support structure is congruous. (See FIG. 4). The support structure comprises a frame 2 having mounting points 3 by which the VAD can be attached to the body of a vehicle.

A hydraulic ram is mounted to the frame 2. The ram comprises a piston 4 and a cylinder 5. The distal end of the piston is rigidly attached to a mounting point 6 at the lower rear of the frame. The cylinder is slidably located in a guide tube 7 at the upper rear of the frame, which constrains the cylinder to move linearly with respect to the frame. The upper end of the cylinder is pivotally attached to the rear end of the wing element 1 at mounting point 8.

The front end of the wing is pivotally attached to one end of a rigid guide strut 9 at mounting point 10. The other end of the guide strut is pivotally attached to a mounting point 11 at the upper forward end of the frame.

As can be seen from a comparison of FIGS. 1 to 3, the action of the guide strut 9 together with the constraint of the cylinder by the guide tube 7 cause the wing element 1 to move in the following manner as the ram 4, 5 is extended:

1. In its stowed configuration (FIG. 1) the wing element 1 is generally horizontal. The cylinder 5 is fully retracted and the rear base of the wing element is substantially flush with the top of the guide tube 7. As will be described in more detail below, in this position the wing is preferably flush with the neighbouring static bodywork of the car. The aerodynamic cross-section of the wing, as defined by its upper and lower skins 12, 13 is selected so that in this position it presents little air resistance to a horizontal air flow from front to rear.

2. When the cylinder 5 is partially raised to a downforce configuration (FIG. 2) the rear of the wing element lifts off the guide tube 7 and rotates anti-clockwise (when viewed from the left of the vehicle) about a longitudinal axis. In this configuration the wing presents a greater aspect to a horizontal airflow than in its stowed configuration. Since the linkages between mounting points 8, 10 and 10, 11 and 11, 6 are rigid, the strut 9 rotates clockwise (when viewed from the left of the vehicle), causing the front of the wing to lift above its location in the stowed configuration and to move rearwards. The aerodynamic cross-section of the wing is selected so that in this configuration it provides—in comparison to the configuration of FIG. 1—increased downforce, and preferably no substantial increase in drag, under the influence of a horizontal air flow from front to rear.

3. When the cylinder 5 is fully raised to its air brake configuration (FIG. 3) the wing is further rotated anti-clockwise so that it presents an even greater aspect to a horizontal airflow than in its downforce configuration. The strut 9 rotates further clockwise, causing the front of the wing to lift further. The aerodynamic cross-section of the wing is selected so that in this configuration it substantially resists a horizontal air flow from front to rear, allowing it to act as an air brake. The action of the linkages between points 8, 10 and 10, 11 and 11, 6 is such that as the wing element is raised to its air brake configuration the motion of the wing is not substantially resisted, and if anything is assisted by the rearwards airflow. The motion of the rear end of the wing is substantially vertical and rearwards, which is not substantially against the airflow. The motion of the front end of the wing is upwards and rearwards, which is with the airflow. Thus the motion defined by the linkages is such as to reduce the force needed to raise the wing to the air brake position in comparison to merely driving the wing rotationally. It would be expected that when the wing is to be lowered from the air brake position the vehicle will be travelling more slowly and so the influence of the airstream on the motion of the wing will be less significant. The action of the VAD is also enhanced by the fact that the wing is raised by a linear actuator (ram 4, 5) which is constrained such that it cannot swing rearwards. This is considerably more mechanically advantageous than driving the wing by a rotational actuator.

When the wing is acting as an air brake the braking force is primarily transmitted to the frame 2 by the guide tube 7 resisting torque of the cylinder 5 about a horizontal axis. Thus the braking force is not acting directly against the longitudinal axis of the actuator of the wing. This reduces the force that the actuator needs to be able to provide, and hence reduces the weight of the actuator that is needed.

It will be noted that in this design the same actuator (ram 4, 5) can move the wing from its resting position to the downforce position and to the air brake position. This avoids the need for additional actuators. Under the continuous action of the actuator the wing can be moved continuously from stowed configuration to downforce configuration and then to airbrake configuration, and vice versa, even at high speed.

Because a hydraulic ram is used to move the VAD into its air brake configuration, the air brake position can be reached quickly when the car is in motion. This makes it practical to integrate the air brake with the car's wheel braking system so that the air brake is deployed automatically each time the driver presses the brake pedal, and reverts quickly to the stowed or downforce position when the brake pedal is released.

FIG. 4 shows the whole VAD assembly ready for installation in a vehicle. The assembly comprises wing 1; the left frame 20 as shown in FIGS. 1 to 3; a corresponding right frame 21 which carries a second hydraulic ram 22 mounted to the right end of the wing 1; left and right stanchions 23, 24 by means of which the VAD can be attached to the vehicle;

hydraulic piping 25 to the rams; a hydraulic valve unit 26 and an electronic control unit 27 which is coupled to the valve unit 26. The hydraulic valve unit 26 sets the flow of fluid to the rams 4,5 and 22 to cause them to raise or retract. The hydraulic supply could come from another part of the vehicle, for example from its clutch hydraulics, or less preferably its brake hydraulics. Preferably it is supplied from a hydraulic circuit that is driven mechanically, e.g. by a mechanical pump of the engine, so that it can be actuated even if electric systems of the vehicle fail. The electronic control unit receives a number of inputs which indicate the status of the vehicle, for example whether the driver has enabled the VAD system, and whether the driver is pressing the brake pedal. In dependence on those inputs the control unit determines the desired position of the wing element 1 and signals the hydraulic valve unit to control the supply to fluid to the rams accordingly. The electronic control unit could be embodied in hardware, or could comprise a processor and a memory that stores program code for execution by the processor. The control unit is configured such that depending on the state of the vehicle it can cause the wing element to stop in the stowed position, the air brake position or any of a range of downforce positions between the two, and to move between any of them whilst the car is in driving. The driver may select, by means of a driver control, the downforce position that he considers provides the best amount of downforce for a particular route or track.

The vehicle could be configured to signal the control unit 27 if there is a failure of the vehicle's wheel brake system. In that situation the control unit could be configured to raise the wing to the air brake configuration automatically.

FIG. 5 shows the VAD installed in a vehicle and in its air brake configuration.

In this particular installation the left and right guide tubes 7 are exposed. This means that even when the wing 1 is in its stowed configuration, both its upper and lower surfaces are exposed to the air flow. In other installations, the VAD could be installed so that in the stowed configuration the wing 1 is recessed into a cavity in the vehicle and only its upper surface is exposed to the air flow when it is stowed. In the installation shown in FIG. 5, since the guide tubes 7 are exposed to the air flow, they are faired to reduce drag.

In the installation shown in FIG. 5, when the wing is in its stowed configuration its upper surface is flush with the upper surfaces of side wings 30 of the vehicle.

FIG. 6 shows a cross-section through the wing element 1 of FIG. 5 on the line A-A'.

The wing element includes a high-level brake light or CHMSL (centre high-mounted stop light) shown at 31 in FIG. 5 and illustrated in more detail in FIG. 6. The CHMSL comprises a lighting element 40, a translucent or transparent external cover 41 and a lens 42. The lighting element could be a bulb or an LED. Most preferably it comprises a row of LEDs extending horizontally along the interior of the wing. The external cover 41 is translucent to permit light from the lighting elements to shine out of the wing. It is apparent from FIGS. 1 to 3 that there can be considerable angular motion of the wing 1. To ensure that light from the lighting element 40 is visible behind the vehicle irrespective of the position of the wing, a wide-angle lens 42 is installed behind the lighting element 40. This spreads light from the lighting element through an arc such that light from the element can be seen from behind the vehicle irrespective of the angular position of the wing.

The VAD could be mounted elsewhere on the vehicle, for example at the front.

The linear actuator need not be mounted directly to the wing. The wing could continue rearwards beyond its attachment point to the linear actuator.

The wing could continue forwards beyond its mounting point to the guide strut 9.

The vehicle is preferably a sports car, but could be any other kind of vehicle, for example a boat or an aircraft.

Instead of having actuators and supports at each end of the wing, there could be a single central actuator and support. There could be more than two actuators and supports.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A variable aerodynamic device for a vehicle, comprising:
a wing element having a front and a rear;
a body for mounting to a vehicle;
a linear actuator mounted between the body and a first location on the wing element for moving the rear of the wing element between a raised position and a lowered position relative to the body; and
a linkage mounted between the body and the wing element, the linkage being pivotally coupled to the wing element at a second location forwards of the first location;
the linkage being configured such that when the rear of the wing element is moved by the linear actuator from the lowered position to the raised position the second location moves rearwardly relative to the body and the wing element rotates about a longitudinal axis;
wherein the linkage comprises a strut pivotally connected to the wing at the second location and directly pivotally attached to the body at a third location.

2. A variable aerodynamic device as claimed in claim 1, wherein the body comprises a mount for the linear actuator which is configured so as to constrain the linear actuator from moving rearwardly when the rear of the wing element is in the raised position.

3. A variable aerodynamic device as claimed in claim 2, wherein the mount for the linear actuator is configured so as to constrain the linear actuator to move linearly relative to the body.

4. A variable aerodynamic device as claimed in claim 2, wherein the mount for the linear actuator comprises a tube through which the linear actuator passes.

5. A variable aerodynamic device as claimed in claim 1, wherein the linear actuator is pivotally mounted to the wing at the first location.

6. A variable aerodynamic device as claimed in claim 1, wherein when the rear of the wing element is in its lowest position the angle between the line connecting the first and second locations and the line connecting the second and third locations is less than 60 degrees.

7. A variable aerodynamic device as claimed in claim 1, wherein when the rear of the wing element is in its highest position the angle between the line connecting the first and second locations and the line connecting the second and third locations is greater than 120 degrees.

8. A variable aerodynamic device as claimed in claim 1, wherein the profile of the wing element is such that in a first position of the wing element relative to the body the wing element is streamlined so as to be capable of imposing substantially no rearward force on the body as a result of the action of rearward airflow on the wing.

9. A variable aerodynamic device as claimed in claim 1, wherein the profile of the wing element is such that in a second position of the wing element relative to the body the wing element is capable of imposing a downforce on the body as a result of the action of rearward airflow on the wing.

10. A variable aerodynamic device as claimed in claim 8, wherein the profile of the wing element is such that in a second position of the wing element relative to the body the wing element is capable of imposing a downforce on the body as a result of the action of rearward airflow on the wing, and wherein in the second position the front and/or rear of the wing is higher than in the first position.

11. A variable aerodynamic device as claimed in claim 1, wherein the profile of the wing element is such that in a third position of the wing element relative to the body the wing element is capable of imposing a rearward force on the body as a result of the action of rearward airflow on the wing.

12. A variable aerodynamic device as claimed in claim 8, wherein the profile of the wing element is such that in a third position of the wing element relative to the body the wing element is capable of imposing a rearward force on the body as a result of the action of rearward airflow on the wing, and wherein in the third position the front and/or rear of the wing is higher than in the first position.

13. A variable aerodynamic device as claimed in claim 9, wherein the profile of the wing element is such that in a third position of the wing element relative to the body the wing element is capable of imposing a rearward force on the body as a result of the action of rearward airflow on the wing, and wherein in the third position the front and/or rear of the wing is higher than in the second position.

14. A variable aerodynamic device as claimed in claim 1, wherein the profile of the wing element is such that in a first position of the wing element relative to the body the wing element is streamlined so as to be capable of imposing substantially no rearward force on the body as a result of the action of rearward airflow on the wing, wherein the profile of the wing element is such that in a second position of the wing element relative to the body the wing element is capable of imposing a downforce on the body as a result of the action of rearward airflow on the wing, wherein the profile of the wing element is such that in a third position of the wing element relative to the body the wing element is capable of imposing a rearward force on the body as a result of the action of rearward airflow on the wing, and wherein the linear actuator is capable of moving the wing element continuously between the first, second and third positions.

15. A variable aerodynamic device as claimed in claim 14, comprising a control unit configured for causing the wing element to rest in each of the first, second and third positions.

16. A variable aerodynamic device as claimed in claim 1, wherein the wing element comprises a high-level stoplight, the high-level stop light comprises a light source and a wide-angle lens for dispersing light from the light source so that it can shine rearwardly throughout the rotational range of the wing element.

17. A vehicle comprising:
a vehicle body; and
a variable aerodynamic device as claimed in claim 1 mounted to the vehicle body.

18. A variable aerodynamic device as claimed in claim 1, wherein the profile of the wing element is such that in a first position of the wing element relative to the body the wing element is streamlined so as to be capable of imposing substantially no rearward force on the body as a result of the action of rearward airflow on the wing, wherein the profile of the wing element is such that in a second position of the wing element relative to the body the wing element is capable of imposing a downforce on the body as a result of the action of rearward airflow on the wing, wherein the profile of the wing element is such that in a third position of the wing element relative to the body the wing element is capable of imposing a rearward force on the body as a result of the action of rearward airflow on the wing, wherein in the third position the front and/or rear of the wing is higher than in the second position, and wherein the linear actuator is capable of moving the wing element continuously between the first, second and third positions.

19. A variable aerodynamic device as claimed in claim 1, wherein the linkage is configured such that when the rear of the wing element is moved by the linear actuator from the lowered position to the raised position the linkage rotates in the opposite direction to the wing element.

20. A variable aerodynamic device for a vehicle, comprising:
a wing element having a front and a rear;
a body for mounting to a vehicle;
a linear actuator mounted between the body and a first location on the wing element for moving the rear of the wing element between a raised position and a lowered position relative to the body; and
a linkage mounted between the body and the wing element, the linkage being pivotally coupled to the wing element at a second location forwards of the first location;
the linkage being configured such that when the rear of the wing element is moved by the linear actuator from the lowered position to the raised position the second location moves rearwardly relative to the body;
wherein the linkage comprises a strut pivotally connected to the wing at the second location and pivotally connected to the body at a third location; and
wherein when the rear of the wing element is in its lowest position the angle between the line connecting the first and second locations and the line connecting the second and third locations is less than 60 degrees.

21. A variable aerodynamic device as claimed in claim 20, wherein the body comprises a mount for the linear actuator which is configured so as to constrain the linear actuator from moving rearwardly when the rear of the wing element is in the raised position.

22. A variable aerodynamic device as claimed in claim 1, wherein the linear actuator is rigidly attached to the body.

* * * * *